G. WEBSTER.
SEPARATOR BOWL.
APPLICATION FILED MAY 29, 1908.
913,079.
Patented Feb. 23, 1909.
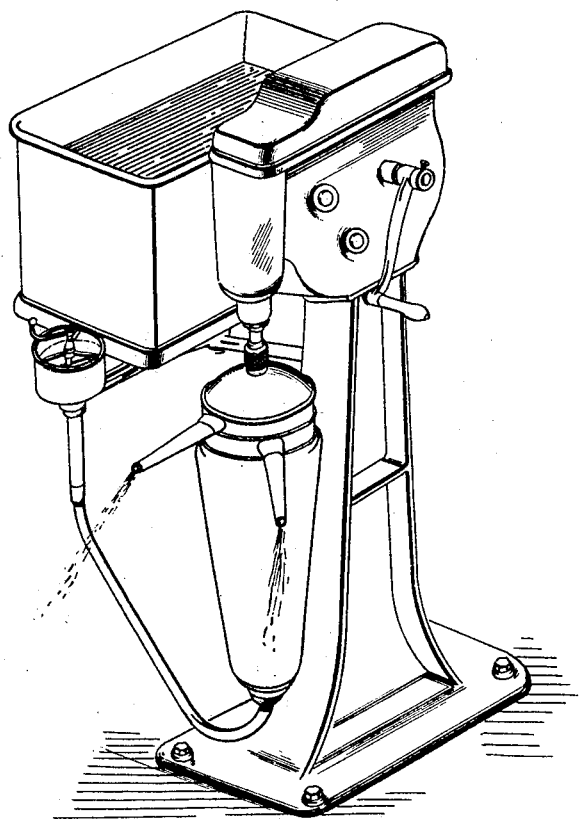
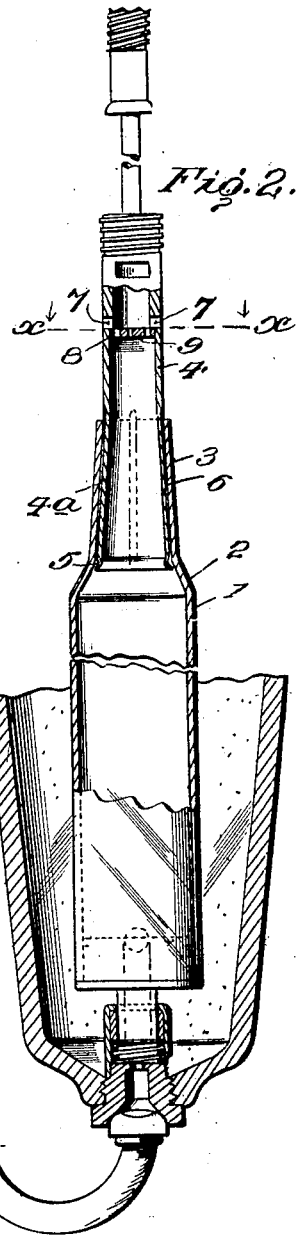
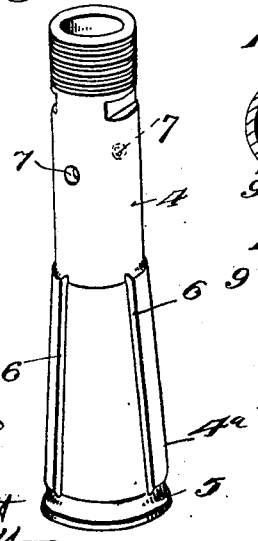
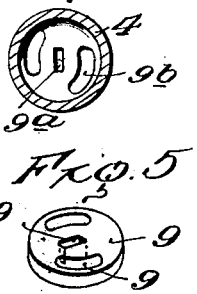
Witnesses
Inventor
G. Webster:
By
Attorneys
THE NORRIS PETERS CO., WASHINGTON, D.C.

UNITED STATES PATENT OFFICE.

GEORGE WEBSTER, OF CHRISTIANA, PENNSYLVANIA.

SEPARATOR-BOWL.

No. 913,079.

Specification of Letters Patent.

Patented Feb. 23, 1909.

Application filed May 29, 1908. Serial No. 435,766.

*To all whom it may concern:*

Be it known that I, GEORGE WEBSTER, citizen of the United States, residing at Christiana, in the county of Lancaster and State of Pennsylvania, have invented certain new and useful Improvements in Separator-Bowls, of which the following is a specification.

The present invention relates to improvements in cream separators of that type which embody a rotary bowl and utilize centrifugal force for separating the cream from the milk.

The object of the invention is the provision of a separator of this character which embodies few and simple parts and will operate in an effective manner to separate the globules of cream from the remainder of the milk.

The invention further contemplates a construction in which the parts are formed and arranged in such a manner that they can be readily dismounted and cleaned with a comparatively small amount of labor.

For a full understanding of the invention and the merits thereof and also to acquire a knowledge of the details of construction and the means for effecting the result, reference is to be had to the following description and accompanying drawings, in which:

Figure 1 is a perspective view of a complete cream separator showing one manner of mounting a separator bowl provided with a tubular plug embodying the invention. Fig. 2 is an enlarged detail view of the bowl, portions being broken away and shown in section. Fig. 3 is a detail perspective view of the tubular plug at the upper end of the bowl. Fig. 4 is a transverse sectional view on the line $x$—$x$ of Fig. 2. Fig. 5 is a detail view of the cream plate.

Corresponding and like parts are referred to in the following description and indicated in all the views of the drawings by the same reference characters.

Referring to the drawing, the numeral 1 designates the bowl of a centrifugal separator which is designed to be mounted so as to revolve about a vertical axis, the milk being fed to the bowl at the lower end thereof and the cream being separated therefrom as it rises within the bowl. Any suitable means such as that employed in the usual forms of cream separators may be employed for feeding the milk to the lower end of the bowl and causing it to rise therein. The upper end of the bowl 1 is contracted at 2 and then tapered at 3, the tapered portion having a diameter somewhat smaller than that of the bowl. Fitted within this tapered portion 3 is a tubular plug 4 the upper end of which projects beyond the bowl and is threaded for engagement with a shaft by means of which the bowl is rotated. The lower end of the tubular plug is flared outwardly at $4^a$ and is designed to have a wedge engagement with the tapered portion 3 of the bowl. The plug is inserted in position from the bottom of the bowl and the frictional engagement between the flared end of the plug and the tapered portion 3 of the bowl serves to lock the two members firmly together. However, when it is desired to dismount the parts for cleaning the same the plug can be readily forced downwardly out of position. The lower extremity of the tubular plug serves as a dividing wall to separate the cream from the milk, the milk passing upon the exterior of the plug while the cream passes through the interior thereof. As the milk rises within the bowl and the latter is rapidly rotated the action of centrifugal force will force the skimmed milk outward against the wall of the bowl while the cream will rise upward along the inner side of the skimmed milk. At the upper end of the bowl the skimmed milk will pass upon the exterior of the plug 4 while the cream will pass through the interior of the plug. The lower end of the plug is provided upon its exterior with an annular groove or depression 5 which receives the skimmed milk which has been separated from the cream and communicating with this groove are the longitudinal channels 6 which lead the skimmed milk to the upper end of the tapered portion 3 of the bowl where it is discharged.

A pair of cream vents 7 are formed in the plug 4 above the separator bowl and immediately below these vents is a downwardly facing shoulder 8. Fitting removably against this shoulder and held in position by a frictional engagement with the walls of the tubular plug is a cream plate 9 provided with a central slot $9^a$ and also with the two concentric slots $9^b$. This cream plate operates to dam back the cream and retard the flow thereof so as to regulate the consistency of the cream.

Any suitable means may be utilized for applying power to the shaft having the tubular plug connected thereto and when the bowl is rapidly rotated and milk caused to flow upwardly therethrough, the cream and skimmed milk will be separated as heretofore described, the cream passing through the tubular plug and being discharged through the cream vents 7 therein while the skimmed milk passes upon the exterior of the tubular plug and is discharged through the longitudinal channels 6 therein.

When it is desired to clean the separator it is merely necessary to dismount the parts by forcing the tubular plug downwardly within the bowl and driving the cream plate through the flared end of the plug.

Having thus described the invention, what is claimed as new is:

1. In a cream separator, the combination of a bowl, means for rotating the bowl, means for feeding milk to the bowl at one end thereof, a tubular plug at the opposite end of the bowl for separating the milk from the cream, the milk passing upon the exterior of the tubular plug while the cream passes through the same, the said plug being provided upon its interior with an annular shoulder, and a perforated plate fitted removably within the plug and bearing against the shoulder, the said cream plate serving to retard the flow of cream.

2. In a cream separator, the combination of a bowl, means for rotating the bowl, means for feeding milk to the bowl at one end thereof, a tubular plug applied to the opposite end of the bowl, the inner edge of the tubular plug serving to divide the cream and skimmed milk, the former passing through the interior of the plug while the latter passes upon the exterior of the plug, the said exterior of the plug being provided toward the inner end of the plug with an annular groove to receive the skimmed milk and also with a longitudinal channel communicating with the annular groove.

3. In a cream separator, the combination of a bowl having one end thereof tapered, means for feeding milk to the bowl, means for rotating the bowl, and a tubular plug fitted within the tapered portion of the bowl and having a flared formation for frictionally engaging the same, the inner edge of the tubular plug serving to separate the cream from the skimmed milk and the plug being formed with a cream vent, the milk passing upon the exterior of the plug while the cream passes through the same.

In testimony whereof I affix my signature in presence of two witnesses.

GEORGE WEBSTER. [L. S.]

Witnesses:
J. A. HARRAR,
M. P. COOPER.